United States Patent [19]

Pichler et al.

[11] 4,338,357
[45] Jul. 6, 1982

[54] METHOD OF COATING FIBROUS REINFORCEMENT MATERIAL

[75] Inventors: Herwig Pichler, Schwaz; Harald Helletsberger, Wattens; Ernst Geissler, Schwaz; Heinrich Ofer, Vomp; Bernhard Fugenschuh, Rum, all of Austria

[73] Assignee: Tyrolit Schleifmittelwerke Swarovski K.G., Austria

[21] Appl. No.: 210,371

[22] Filed: Nov. 26, 1980

Related U.S. Application Data

[63] Continuation-in-part of Ser. No. 96,246, Nov. 20, 1979, abandoned, which is a continuation-in-part of Ser. No. 943,352, Sep. 18, 1978, abandoned.

[30] Foreign Application Priority Data

Sep. 23, 1977 [AT] Austria .................................. 6822/77

[51] Int. Cl.$^3$ ......................... B05D 1/36; B05D 3/02
[52] U.S. Cl. ..................................... 427/195; 51/295; 51/308; 427/202; 427/407.3; 427/412; 428/237
[58] Field of Search ................. 51/400, 402, 404, 407, 51/308, 295; 427/195, 202, 430.1, 196, 201, 407.3, 412; 428/237

[56] References Cited

U.S. PATENT DOCUMENTS

| 2,404,207 | 7/1946 | Ball ........................................ 51/400 |
| 2,748,019 | 5/1956 | Schramm .............................. 117/31 |
| 4,122,211 | 10/1978 | Kikuga et al. ......................... 427/27 |
| 4,158,073 | 6/1979 | Schneider et al. .................. 427/195 |

FOREIGN PATENT DOCUMENTS 1130331 10/1968 United Kingdom ................ 427/195

*Primary Examiner*—Shrive P. Beck
*Attorney, Agent, or Firm*—McGlew and Tuttle

[57] ABSTRACT

An improved method for coating fibers, for example, glass fibers, which are used in reinforcement webs for objects under high strain e.g. in grinding discs.

The fibers are subjected to a two stage coating. In the first stage the fibers are coated with a liquid resin or resin solution.

In the second stage resin in powdered form is deposited on the fibers.

Thereafter, the fibers are subjected to a heat treatment.

The products obtained are tacky to the touch and are used in this state in other mixtures of resinous binders and the like so that a good contact is made between the reinforcing material and the additional binder.

14 Claims, 4 Drawing Figures

Fig. 1 (PRIOR ART)
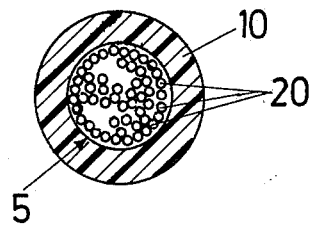
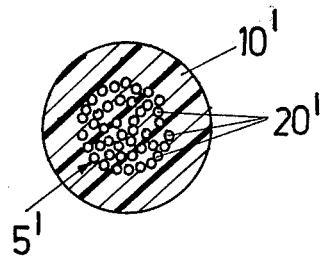
Fig. 4
Fig. 2
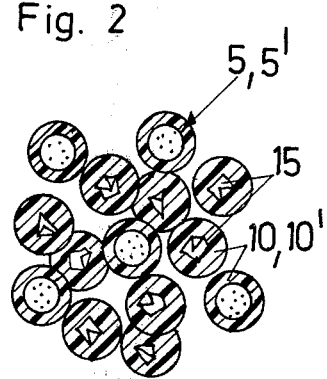
Fig. 3
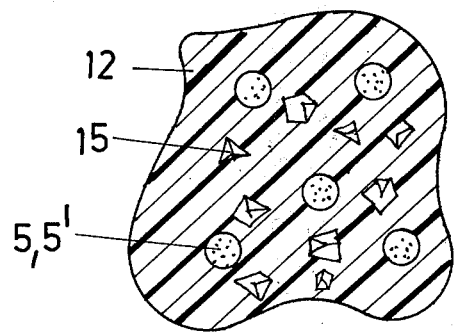

4,338,357

METHOD OF COATING FIBROUS REINFORCEMENT MATERIAL

FIELD AND BACKGROUND OF THE INVENTION

This is a continuation in part of Ser. No. 096,246 filed Nov. 20, 1979, which itself was a continuation in part of Ser. No. 943,352 filed Sept. 18, 1978, which are both now abandoned.

The invention relates to a method of coating fibrous reinforcement material comprising at least one fiber having multifilaments for objects under high strain.

For example, in order to increase the strength and the bursting velocity of grinding discs, especially grinding discs that are used for free hand grinding, inserts of reinforcement webs such as glass fibers are used.

Since raw fibers with no coating have only a poor hold, or no hold at all, on the abrasive mix, it is necessary to coat the fibers with a resin before putting them into the abrasive mix. The connection between the abrasive mix and the reinforcement fibers, e.g. glass fibers, is achieved in two stages; first, bonding of the resin on the fiber, and second, the binding of the resin with the binding agent of the abrasive mix. If the reinforcement material is to be fully utilized no weak links in this connection are allowed.

What is required is: a flawless transfer of force from the abrasive mix to the fibers of the reinforcement webs in the finished disc; sufficient stability of the disc before curing of the binding agent, which requires a certain tackiness of the resin; and a certain flexibility of the web before curing the disc. This is especially important with thin grinding discs. As reinforcement resins, phenolic resins and epoxy resins can be used.

Usually modified phenolic resins are used because phenolic resins show bad bonding characteristics on glass but do otherwise have a good resistance to temperature. Epoxy resins and acetate resins have good adhesion on the glass fibers but are expensive and their resistance to temperature is poor. Therefore, in most cases a combination of different resins is used.

According to one method, the web or the fibers that are to be impregnated are put into a resin solution which has a resin content of 70%. The surplus resin is then removed by squeezing the web between two rolls. After this, the reinforcement web is dried in a tunnel oven for one minute at a temperature of 140° C. During drying, the share of the solvent is reduced from 30% to 5% relative to the resin.

The disadvantages of this method are the following: If, for example, 60 kg alcohol, which is widely used as solvent, evaporate in an hour, this requires 3000 m³ hot air with a temperature of 150° C. in order to avoid any risk of an explosion. According to environment rules this hot air has to be postheated to a temperature of 700° C. The costs for this postheating, and especially the costs for the plant in which it is done, are extremely high. In addition, due to environment regulations it is not possible to let the air with a temperature of 700° C. out of the plant. Therefore the air must be cooled before being released.

Systems with less solvent, that is, those with more water have not proved to be successful. This is mainly due to the fact that during the hot air drying a skin is formed on the surface of the resin which hampers evaporation of the solvent.

Theoretically water ($H_2O$) could be used as a solvent but it has shown to be not practicable. Usuable solvents are, for example, alcohol and acetone. Such solvents are here termed "volatile solvents". Their disadvantage is that they are toxic, combustible and raise the danger of explosion. In general a mixture of solvents is used.

The main problem with the methods according to the prior art lies in the fact that large amounts of solvent have to be removed and disposed of. For example, 30% solvent in the coating mass is considered to be a large amount.

In order to prevent any danger of explosion, the share of alcohol in the air must not exceed 20 g/m³. In this proportion, alcohol is not combustible, which makes the installation of a postheating plant after the coating plant necessary.

SUMMARY OF THE INVENTION

The method according to the invention solves this problem by depositing on said fibrous material and between said multifilaments, by soaking said fibrous material in a solvent solution, containing much volatile solvent, of curable resin an amount of resin equal to 5 to 50% of the weight of the total quantity of the resin to be deposited on the fibrous material;

subsequently depositing on the wet fibrous material a powder comprising the remainder of the total quantity of resin which is soluble in the solvent on the fibrous material; and heating the coated fibrous material until it reaches a temperature at least sufficient to obtain sintering of the resin and at which the fibrous material is partially cured and tacky;

the amount of solvent in said solution being sufficient so that the powder is fused by the solvent and at least 2% by weight of the solvent remains in the tacky fibrous material.

Preferably, the amount of resin used in a liquid resin solution is about 10 to 25% by weight, of the total amount of resin in the coating.

Also, the resin that is in powder form can be applied to the fibers in layers, and the layers can be of different resins. Good results were obtained when using different curable resins for the resin solution and the resin powder. For the powder, pure novolak resins without a hardener such as hexamethylenetetramine can be used.

Phenolic resins of the resol type, epoxy resins, solutions of phenolic resins, and epoxy resins can be used as the fluid or resin solution for the first coating.

This invention results in better storage life of the web and a better wear resistance during the grinding process.

According to the invention, epoxy and phenolic resins can be used together. It has proven advantageous to use electrostatic coating when coating the fibers which are covered by the resin solution with the resin powder.

The heat treatment of the fibers and the fusing or better the sintering of the resin coating is preferably done with high frequency.

The ratio of mass and resin content of the liquid primary coating and the main coating with resin powder should be such that only 5 to 10% solvent by weight relative to the complete coating are deposited in the fibers.

The purpose of the heat treatment is to homogenize and to set the resin coating and not to dry the coating. However, during the heat treatment the solvent evaporates. A residue of 2 to 5% solvent by weight is necessary in order to keep the resin tacky.

According to the invention, the webs or fibers are treated in the following manner. The reinforcement web, which may consist of glass fibers, is coated with a resin solution of high liquidity, which may be done using methods according to the prior art. Since the mass of resin is only 5% to 50% by weight of the requested total mass of resin, special resins and very expensive resins can be used.

After this first coating with liquid, the rest of the resin (50 to 95% by weight) is deposited on the fibers in the form of a resin powder, preferably by the method of electrostatic coating.

Afterwards, the web undergoes a heat treatment in order to fuse or at least sinter the resin coating. For example, the web can be exposed to temperatures of approximately 70° to 100° C.

Heating by high frequency is advantageous because it results in fast and uniform heating through the whole cross section of the coated fiber.

For the primary first liquid coating, a solution is chosen in which the residue of solvent is at least approximately equal to the volatile portion which is required in the end product.

OBJECTS AND ADVANTAGES OF THE INVENTION

The product obtained by the method according to the invention is a known product of commerce and includes a solvent and resin which has not, as of yet, set. These products are tacky to the touch and are used in this state in other mixtures of resinous binders and the like so that a good contact is made between the reinforcing material and the additional binder.

Known methods of making such a known product involve, as described before, the use of very liquid solutions or mixtures of solvent and resin which required drying to produce the tacky state. The drying would evolve large amounts of evaporated solvent into the atmosphere which are polluting and toxic. The invention, on the other hand, reaches the same end result, that is, a tacky product which can be used as reinforcing material e.g. in grinding wheels and the like, but which evolves, as evaporated solvent, a drastically reduced amount of solvent. This is accomplished by using a minimal quantity of solvent in a first portion of the resin to first soak and saturate between monofilaments of the fibers. On thus soaked reinforcing material is then coated with the remainder of the resin. This resin is also soluble in the solvent of the first portion of resin. Sufficient solvent is provided in the first liquid phase to entirely saturate the powdered resin which is added and also provide a remaining portion of solvent within the reinforcement to retain the tacky feel of the reinforcement. This intermediate product while being tacky has a life, however, of up to several months and is known item of commerce and distribution.

It is one of the objects of the invention to obtain better storage life of the web and a better wear resistance during the grinding process.

Other objects are to obtain a remarkable reduction of the necessary solvent and gas down to the range of 5 to 10% by weight and an improvement of the adhesion and hold of the reinforcement web in the grinding article by coating the web with two or more layers (e.g. Epoxy Phenol). In addition, solvent systems that are non volatile can be used, thereby increasing the storage life of the coated webs.

A still further object is to make it possible to mix active fillers (fillers active in the grinding process), such as cryolite (Kryolith) or sulphides, into the coating powder.

Yet another object is to reduce the amount of hot air and energy needed. As a result, it is possible to work with a smaller plant for postheating than in the case of the methods known up to date. If suitable solvent systems are used, no postheating plant is necessary at all, which reduces the cost of the entire plant considerably, and the degree of sufficiency in drying and heating is increased. This requires less floor space for the plant. The method according to the invention improves the heat transmission in the coated fiber. It is especially important that no surface film or bubbles or blisters are formed in the resin coating.

For the reinforcement of grinding discs it is advantageous to use wide meshed webs in symmetrical weave (e.g. plain weave or panama weave); other webs (e.g. leno weave) bear the danger of distortion of the grinding discs, especially if they are very thin.

Because the symmetrical weaves have little resistance to shifting as long as they are wet, they have to be dried on very long (and therefore very expensive) horizontal tenter frames. The methods according to the prior art use large amounts of fluidic resin, so that the resin coating tends to sack, causing the finished product to have a thicker resin coating on the bottom side than on the top side.

The present invention, on the contrary, requires that only small amounts of fluidic solvents be used, so that this disadvantage does not occur. Also a short tenter frame can be used.

BRIEF DESCRIPTION OF THE DRAWINGS

In the drawings:

FIG. 1 is a greatly enlarged cross-sectional view of a reinforcement fiber comprising a multitude of monofilaments which is coated by a thick resin coating in accordance with the prior art;

FIG. 2 is an enlarged sectional view of a portion of a grinding disc before it is cured;

FIG. 3 is a view similar to FIG. 2 after the material is cured by heating; and

FIG. 4 is a fiber coated and impregnated in accordance with the invention before it is incorporated into a grinding disc.

DESCRIPTION OF THE PREFERRED EMBODIMENT

The inventive method provides a grinding disc or the like which is exceedingly strong and resistant to bursting even when operated at high speeds and under robust conditions since very intimate contact and connection is achieved between the reinforcing fibers used in the method and the rest of the grinding disc material including the abrasive grains incorporated therein. Examples of the invention are as follows:

Raw web
| | |
|---|---|
| web in panama weave | weight per unit area 450 g/m² |
| requested portion of volatile by weight: | 10% |
| requested portion of resin by weight: | 31% |

| -continued | |
|---|---|
| Total weight: | 650 g |

Primary coating

Solution Resol 70% by weight in 15% by weight methyl alcohol and 15% by weight water coat 49 g per m² resin=70% solvent by weight.

Main coating

Novolak pulverized with 8% hexamethylenetetramine by weight as hardener.

141 g of Novolak: m²

Approximate loss of solvent 10.5 g/m², equivalent to 5 g alcohol/m².

Plant operating speed 20 m/min at a working width of 1.5 m.

Capacity: 1800 m²/hour.

Evaporated Alcohol: 9.5 kg/hour.

Therefore necessary: 500 m³ air.

The web is heated up to 90° C. by high frequency induction heating to produce high frequency losses in the coated porous material to heat the same to the desired temperature. With a plant and a method according to the prior art, a coating of this kind requires a solution of 70% resin by weight, 27% alcohol and 3% water, all by weight.

The amount of evaporated alcohol is 70 g/cm² which is 125 kg/hour. For this evaporation, 6300 m³ air with a temperature of 140° C. are necessary.

Turning to the drawings particularly, in FIG. I a fiber generally designated 5 is shown which as with the invention is usually a glass fiber having from 1000 to 3000 monofilaments 20 each having a diameter of between 9 to 13 μm. As seen in FIG. I, a relatively thick resin coating 10 is required to permit sufficient engagement between coated fibers and coated grains shown in FIG. 2 before the mass is heat treated to form the completed grinding disc or the like shown in FIG. 3. While it is necessary to provide a relatively thick resin coating 10, such an application if achieved in a single step does not permit sufficient impregnation and soaking of the spaces between the monofilaments 20 by the resin. In effect, the resin coating 10 thus coats the outer surface of the peripheral monofilaments and does not penetrate into the central regions of the fiber 5.

FIG. 4 shows a coated fiber in accordance with the invention where the reinforcement fibers 5' is not only coated on its exterior by a thick resin coating 10' but also inbetween the monofilaments 20'. A suitably thick resin is thus provided and permits the temporary connection and support of the mass shown in FIG. 2 and also permits the curing step which produces the melted together mass of FIG. 3. Unlike the prior art coated filament shown in FIG. I however the fiber 5' of the invention is more closely united and connected with the melted mass 12 of FIG. 3 and also the abrasive grains or particles 15 used in the grinding disc.

According to the prior art method therefore 100% of the solution having 30% agent is dried leaving 10% of the solution remaining in the finished product. According to one example of the invention, however, 30% of the solution which carries 40% of the solution agentour solvent is applied to the fibers whereafter a remaining 75% of the resin within any liquid or solvent agent whatsoever is added to the already coated fibers which have been soaked through and through by the highly liquid first applied solution and then the mass is dried to leave 10% of the solvent in the finished product. The invention thus permits a build up of a sufficiently thick coating of resin while at the same time providing for the total soaking through of not only the fiber surfaces but also the monofilaments making up the fibers with resin.

While a specific embodiment of the invention has been shown and described in detail to illustrate the application of the principles of the invention, it will be understood that the invention may be embodied otherwise without departing from such principles.

We claim:

1. A method of coating fibrous reinforcement material comprising at least one fiber having multifilaments for objects under high strain, said method comprising the steps of:

depositing on said fibrous material and between said multifilaments, by soaking said fibrous material in a solvent solution of curable thermo-setting resin, an amount of resin equal to 5 to 50% of the weight of the total quantity of the resin to be deposited on the fibrous material;

subsequently depositing on the wet fibrous material a powder comprising the remainder of the total quantity of thermo-setting resin which is soluble in the solvent on the fibrous material; and heating the coated fibrous material until it reaches a temperature at least sufficient to obtain sintering of the resin and at which the fibrous material is partially cured and tacky;

the amount of solvent in said solution being sufficient so that the powder is fused by the solvent and at least 2% by weight of the solvent remains in the tacky fibrous material.

2. The method according to claim 1, in which the amount of resin deposited on said fibrous material by soaking said fibrous material in said resin solution is 10 to 15% of said total quantity of resin to be deposited.

3. The method according to claim 1, in which the resin in said resin solution comprises a phenolic resin of the resol type.

4. The method according to claim 1, in which the resin in said resin solution comprises an epoxy resin.

5. The method according to claim 1, in which the resin in said resin solution comprises a mixture of phenolic and epoxy resins.

6. The method according to claim 1, in which the resin in powdered form is deposited on fibrous material in a plurality of layers.

7. The method according to claim 6, in which each of said layers comprises a different type of resin.

8. The method according to claim 1, in which the powder comprising the remainder of the resin is a different type of resin than the resin in said resin solution.

9. The method according to claim 1, in which the powder comprising the remainder of the resin is a novolak resin without hardener.

10. A method according to claim 1, wherein the object comprises a high speed grinding disc.

11. The method according to claim 10, in which said powder comprises active filler material.

12. The method according to claim 11, in which said active filler material is cryolite.

13. The method according to claim 11, in which said active material is silicon carbide.

14. A method according to claim 1, wherein said solvent solution contains at least about half volatile solvent.

* * * * *